(12) United States Patent
Huang et al.

(10) Patent No.: US 10,996,419 B2
(45) Date of Patent: May 4, 2021

(54) THERMAL COMPENSATING OPTICAL COMPONENT MOUNT AND RELATED DEVICES

(71) Applicant: Newport Corporation, Irvine, CA (US)

(72) Inventors: Paul Huang, Anaheim, CA (US); James Fisher, Tustin, CA (US)

(73) Assignee: NEWPORT CORPORATION, Irvine, CA (US)

( * ) Notice: Subject to any disclaimer, the term of this patent is extended or adjusted under 35 U.S.C. 154(b) by 785 days.

(21) Appl. No.: 15/713,570

(22) Filed: Sep. 22, 2017

(65) Prior Publication Data

US 2019/0033551 A1 Jan. 31, 2019

Related U.S. Application Data

(60) Provisional application No. 62/539,377, filed on Jul. 31, 2017.

(51) Int. Cl.
*G02B 15/14* (2006.01)
*G02B 7/00* (2021.01)

(52) U.S. Cl.
CPC ............. *G02B 7/008* (2013.01); *G02B 7/005* (2013.01)

(58) Field of Classification Search
CPC .................................. G02B 7/008; G02B 7/005
See application file for complete search history.

(56) References Cited

U.S. PATENT DOCUMENTS

| 4,895,430 A | 1/1990 | Jalink |
| 5,140,470 A | 8/1992 | Luecke |

(Continued)

OTHER PUBLICATIONS

Summers, P.T., Chen, Y., Rippe, C.M. et al. Overview of aluminum alloy mechanical properties during and after fires. Fire Sci Rev 4, 3 (2015); Published Apr. 28, 2015 (Year: 2015).*

(Continued)

*Primary Examiner* — Alicia M Harrington

(57) ABSTRACT

A novel optical component mount is disclosed, which includes at least one first mount body with at least one adjustment member traversing through at least one adjustment member passage formed in the first mount body. At least one second mount body is configured with at least one component aperture formed therein and at least one insert receiver formed therein. The insert receiver is configured to receive at least one thermal compensating positioning insert positioned in the insert receiver. The coefficient of thermal expansion of the thermal compensating positioning insert is configured to be equal to the coefficient of thermal expansion of the adjustment member. At least one engaging body is positioned in the thermal compensating insert and engages the adjustment member. The engaging body is configured having a coefficient of thermal expansion less than the coefficient of thermal expansion of the thermal compensating positioning insert and the coefficient of thermal expansion of the adjustment member. At least one biasing system movably couples the second mount body to the first mount body. During use, the combinations of the coefficients of thermal expansion of the components described above, result in minimal changes in position of the optical component mount during changes in ambient temperature.

12 Claims, 12 Drawing Sheets

(56) References Cited

U.S. PATENT DOCUMENTS

| | | | |
|---|---|---|---|
| 5,570,238 A | 10/1996 | Leary | |
| 5,930,057 A | 7/1999 | Sechrist | |
| 6,016,230 A | 1/2000 | Nunnally | |
| 6,304,393 B1 | 10/2001 | Sechrist | |
| 6,631,040 B1 * | 10/2003 | Cox | G02B 7/008 |
| | | | 359/819 |
| 6,650,412 B1 * | 11/2003 | Slater | G01J 3/02 |
| | | | 356/328 |
| 7,126,259 B2 | 10/2006 | Moler | |
| 7,982,980 B2 | 7/2011 | Rigney | |
| 8,403,591 B2 * | 3/2013 | Kozak | F16H 25/20 |
| | | | 403/362 |
| 8,441,748 B2 | 5/2013 | Rigney | |
| 2013/0208367 A1 * | 8/2013 | Thomas | G02B 7/182 |
| | | | 359/732 |

OTHER PUBLICATIONS

The Quadrant group of companies; "Tivar1000 Product Data Sheet"; Published Jan. 25, 2011. (Year: 2011).*

* cited by examiner

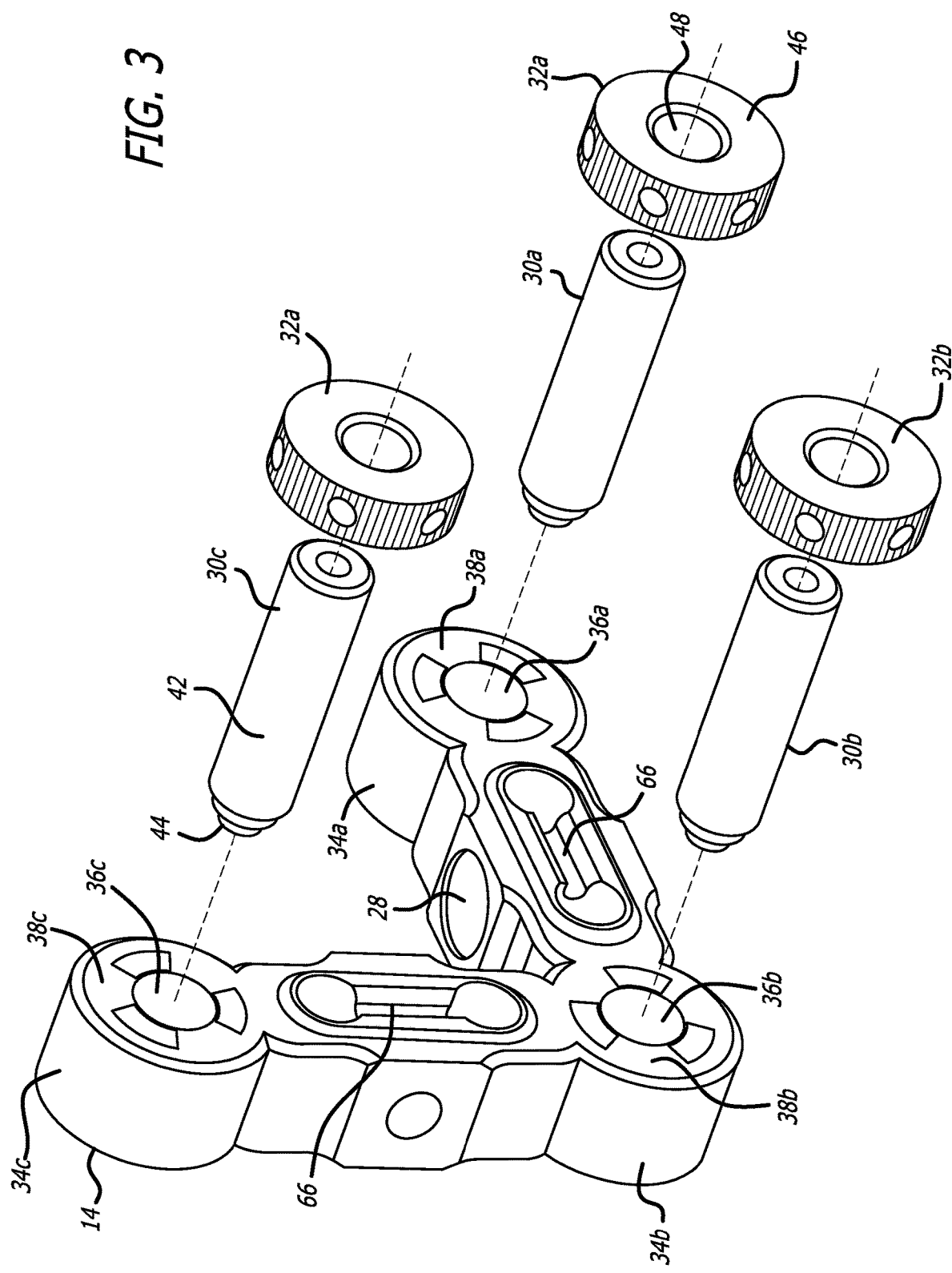

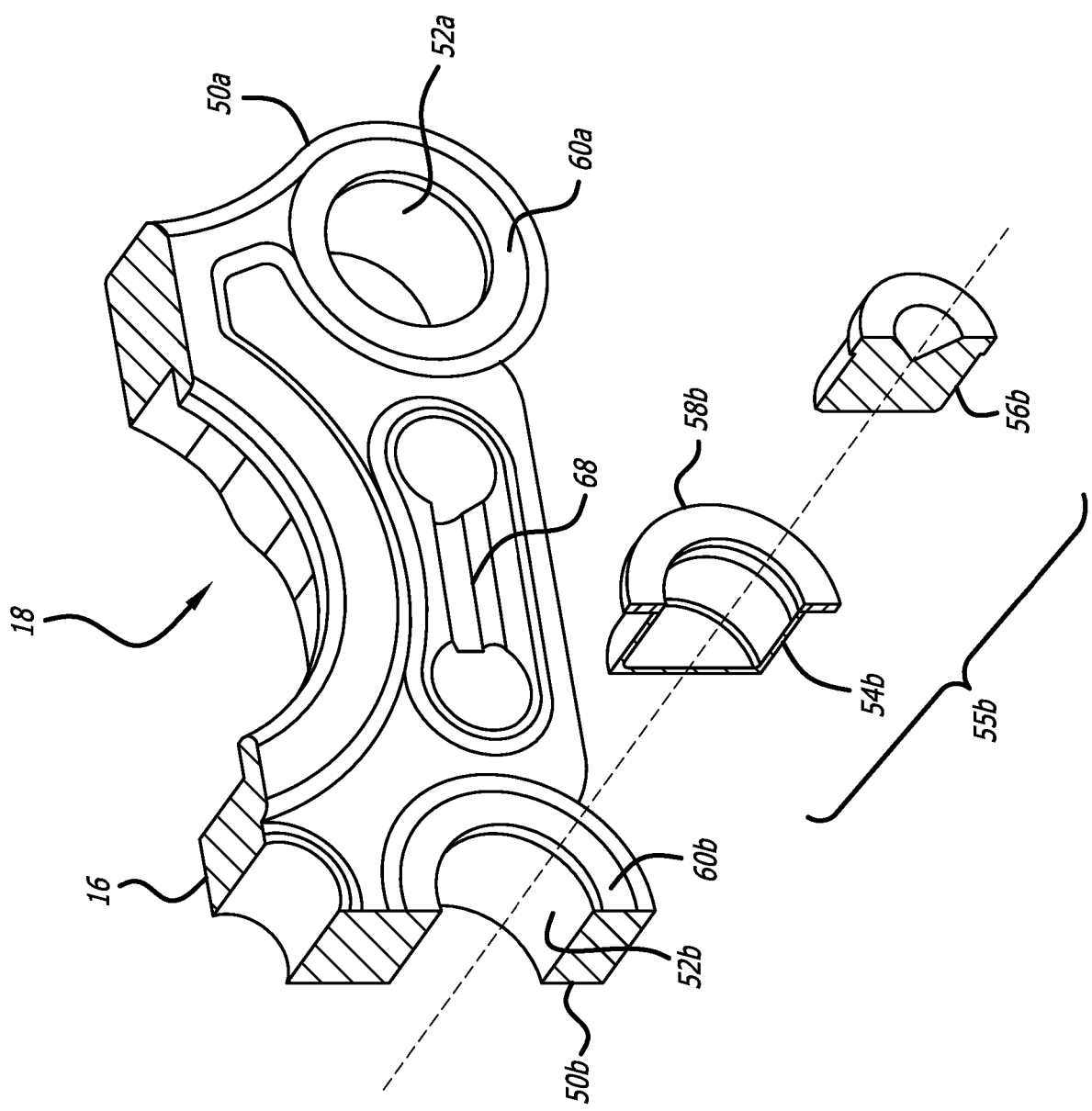

THERMAL COMPENSATING OPTICAL COMPONENT MOUNT AND RELATED DEVICES

CROSS-REFERENCE TO RELATED APPLICATIONS

The present application claims priority to U.S. Provisional Application Ser. No. 62/539,377—entitled "Thermal Compensating Optical Component Mount and Related Devices", filed on Jul. 31, 2017, the contents of which are incorporated by reference in their entirety herein.

BACKGROUND

Optical component mounts are commonly used today. Presently, they are used to hold various optics such as lenses and mirrors used in optical and laser systems. A variety of actuators may be used with these mounts to adjust the position and orientation of the optics in multiple degrees of freedom. When the position and/or orientation of the optic has been set, the user can lock the actuators to prevent further movement of the optic. Shortcomings in optical component mounts have been identified, one of which is that the position or orientation of the optic may change due to temperature gradients or changes in ambient temperature, often affecting the results of sensitive laser experiments or affecting the performance of lasers systems that use such optical component mounts.

Thus, there is an ongoing need for an optical component mount that reduces or eliminates the effects of changes in ambient temperature on the position of optics through the use of thermal compensating components and features.

SUMMARY

The present application is directed at various embodiments of a thermal compensating optical component mount device used to support and position various optical components within an optical system. More specifically, the thermal compensating optical component mount device disclosed herein reduces undesired changes in the position and orientation of an optical component due to temperature gradients and changes in ambient temperature.

In one embodiment, the present application is directed to an optical component mount device and discloses at least one first mount body with at least one adjustment member traversing through at least one adjustment member passage formed in the first mount body. At least one second mount body is configured with at least one component aperture formed therein and at least one insert receiver formed therein. The insert receiver is configured to receive at least one thermal compensating positioning insert therein. The coefficient of thermal expansion of the thermal compensating positioning insert is configured to be equal to the coefficient of thermal expansion of the adjustment member. At least one engaging body is positioned in the thermal compensating insert and engages the adjustment member. The engaging body has a coefficient of thermal expansion less than the coefficient of thermal expansion of the thermal compensating positioning insert and the coefficient of thermal expansion of the adjustment member. At least one biasing system movably couples the second mount body to the first mount body. During use, the combinations of the coefficients of thermal expansion of the components described above result in minimal changes in position of the optical component mount during changes in ambient temperature.

In another embodiment, the present application is directed to an optical component mount device comprising at least one first mount body with at least one adjustment member traversing through at least one adjustment member passage formed in the first mount body. At least one second mount body is configured with at least one component aperture formed therein and at least one insert receiver formed therein. The insert receiver is configured to receive at least one thermal compensating positioning insert therein, with the coefficient of thermal expansion equal to that of the adjustment member. At least one biasing system movably couples the second mount body to the first mount body. During use, the combinations of the coefficients of thermal expansion of the components described above, result in minimal changes in position of the optical component mount during changes in ambient temperature.

Further, the present application is directed to a thermal compensating insert assembly comprising at least one thermal compensating positioning insert and at least one engaging body positioned within the thermal compensating positioning insert, wherein the coefficient of thermal expansion of the engaging body is less than the coefficient of thermal expansion of the thermal compensating positioning insert.

In another embodiment, the present application is directed to a thermal compensating assembly comprising at least one adjustment member, further comprising at least one adjustment member body configured with an insert receiver formed therein, with at least one thermal compensating positioning insert positioned within the insert receiver, and with at least one engaging body positioned within the thermal compensating positioning insert, wherein the coefficient of thermal expansion of the thermal compensating positioning insert is equal to the coefficient of thermal expansion of the adjustment member, and the coefficient of thermal expansion of the engaging body is less than the coefficient of thermal expansion of the thermal compensating positioning insert.

In another embodiment, the present application is directed at a thermal compensating adjustment assembly comprising at least one adjustment member further comprising an adjustment member body and at least one thermal compensating insert having a coefficient of thermal expansion equal to the coefficient of thermal expansion of the adjustment member.

Further, the present application is directed at a method of converting an non-thermal compensating optical component mount to a thermal compensating optical component mount.

Other features and advantages of the thermal compensating optical component mount as described herein will become more apparent from a consideration of the following detailed description.

BRIEF DESCRIPTION OF THE DRAWINGS

Various embodiments of a thermal compensating optical component mount will be explained in more detail by the accompanying drawings, wherein

FIG. 3 shows an exploded perspective view of an embodiment of a first mount body with adjustment members;

FIG. 5 shows an exploded perspective view of a cutaway section of a second mount body;

DETAILED DESCRIPTION

Figure 1A:
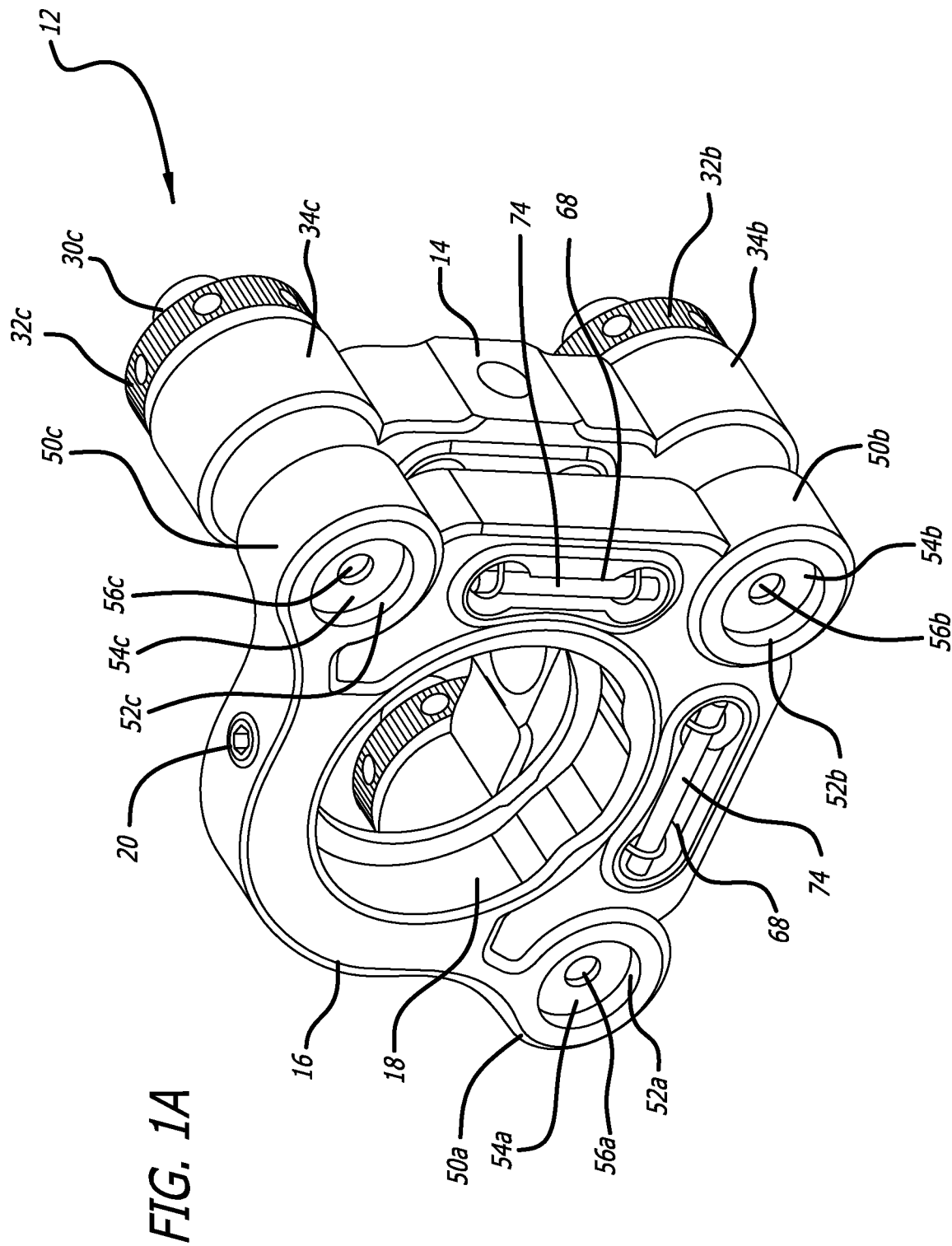
FIG. 1A shows a front elevated perspective view of an embodiment of a thermal compensating optical component mount with three thermal compensating positioning inserts.

The present application is directed to a thermal compensating optical component mount and related devices that are configured to convert a non-thermally compensating optical component mount or similar precision support or mounting device to a thermally compensating optical component mount or similar precision device. While the various embodiments described herein are directed to optical component mounts and similar devices, those skilled in the art will appreciate that the components and inserts described herein may be used in any variety of applications to prevent the undesirable movement of an optical component mount or precision support/mounting device due to temperature gradients or variations in ambient temperature.

FIGS. 1A-5, 6A & 6B show various views of an optical component mount incorporating at least one thermal compensating body or device therein. As shown, the optical component mount 12 includes a first mount body 14 and at least a second mount body 16, although those skilled in the art will appreciate that the optical component mount 12 may include any number of mount bodies. As shown, the second mount body 16 includes at least one component aperture 18 formed therein. Further, as shown in FIGS. 1A, 1B, 2A, 2B and 4, at least one component coupling device 20 may be positioned on or coupled to the second mount body 16. In the illustrated embodiment, the component coupling device 20 is configured to traverse through at least one coupling device receiver 22 formed on the second mount body 16 and configured to selectively engage at least a portion of at least one component positioned within the component aperture 18. Optionally, any variety of component coupling devices or features 20 may be positioned on the second mount body 16 or within the component aperture 18 formed in the second mount body 16. In another embodiment, at least one component coupling device 20 may be positioned on or coupled to the first mount body 14. Optionally, the second mount body 16 may be manufactured without an aperture 18 formed therein. For example, the second mount body 16 may include one or more mounting plates, rods, grating supports, cube holders, filter holders, and the like, rather than an aperture.

As shown in FIGS. 1A-3, 6A and 6B, the first mount body 14 of the optical component mount 12 includes at least one fastener passage 28 formed therein. The fastener passage 28 may be sized to permit at least the first mount body 14 to be selectively coupled to at least one support, optical post, structure or the like by positioning one or more fasteners (not shown) in the fastener passage 28. Further, the optical component mount 12 may include at least one adjustment member 30 configured to selectively traverse through at least a portion of the first mount body 14. In the illustrated embodiment, the adjustment member 30 includes at least one adjustment member body 42 having at least one engaging member 44 formed thereon. In one embodiment, the adjustment member body 42 and engaging member 44 comprises a monolithic structure. As such, the adjustment member body 42 and engaging member 44 may be formed from the same material. In another embodiment, the adjustment member body 42 and engaging member 44 are formed from different materials. For example, the adjustment member body 42 may be manufactured from steel while the engaging member 44 is manufactured from carbide. Optionally, at least one of the adjustment member body 42 and engaging member 44 may be formed from any variety of materials, including, without limitations, aluminum, stainless steel, copper, brass, carbide, tungsten, iron-based alloys, copper-based alloys, aluminum-based alloys, nickel-based alloys, other alloys, engineered plastics, composite materials, and the like. Further, in the illustrated embodiment, the engaging member 44 comprises a spherical body, although those skilled in the art will appreciate that the engaging member 44 may be formed in any variety of shapes and sizes.

Referring again to FIGS. 1A-3, the first mount body 14 may include at least one adjustment region formed thereon. In the illustrated embodiment, the first mount body 14 includes a first adjustment region 34a, a second adjustment region 34b, and a third adjustment region 34c formed thereon. Each adjustment region 34a, 34b, and 34c includes at least one adjustment member passage formed therein. For example, the first adjustment region 34a includes a first adjustment member passage 36a formed therein, thereby permitting at least a portion of at least one adjustment member 30 to traverse through the first mount body 14 via the first adjustment member passage 36a and selectively engage at least a portion of the second mount body 16 or one or more components coupled to or otherwise inserted into the second mount body 16. Similarly, the second adjustment region 34b includes a second adjustment member passage 36b formed therein, while the third adjustment region 34c includes a third adjustment member passage 36c formed therein. Like the first adjustment member passage 36a, the second and third adjustment member passages 36b, 36c, respectively, permit at least one adjustment member 30 to traverse through the first mount body 14 and selectively engage at least a portion of the second mount body 16 or one or more components coupled to or otherwise inserted into the second mount body 16. In one embodiment, at least one of the first, second, and third adjustment member passages 36a, 36b, 36c, respectively, may be configured to engage at least a portion of the adjustment member 30. For example, in one embodiment, at least one of the first, second, and third adjustment member passages 36a, 36b, and 36c, respectively, may comprise a threaded passage configured to engage at least a portion of one or more thread members (not shown) formed on the adjustment member body 42 of the adjustment member 30. Optionally, the first, second, and third adjustment member passages 36a, 36b, and 36c need not engage the adjustment member 30.

Referring again to FIGS. 1A-3, the adjustment regions 34a, 34b, and 34c, respectively, may include at least one passage engaging face formed on any surface of the first mount body 14 and positioned proximate to the adjustment member passages 36a, 36b, and 36c. For example, a first passage engaging face 38a may be positioned proximate to the first adjustment member passage 36a. In addition, a second passage engaging face 38b may be positioned proximate to the second adjustment member passage 36b, while a third passage engaging face 38c may be positioned proximate to the third adjustment member passage 36c.

As shown in FIGS. 1A-3, 6A and 6B, at least one adjustment member lock 32 may be used to restrict or eliminate movement of the adjustment member 30 once the optical component (not shown) being supported by the optical component mount 12 is positioned where desired. The adjustment member lock 32 may be configured to engage one or more threaded members (not shown) formed on the adjustment member body 42 and restrict or prevent the adjustment member 30 from being further inserted through the first mount body 14. In one embodiment, the adjustment member lock 32 may be configured to engage or be positioned proximate to at least one of the passage engaging faces 38a, 38b, 38c, respectively, of the first, second, and third adjustment member passages 36a, 36b, and 36c. In the illustrated embodiment, the adjustment member lock 32 may comprise at least one lock body 46 having at least one adjustment member passthrough 48 formed therein, the adjustment member passthrough 48 configured to have at least one adjustment member 30 traverse there through. Optionally, the optical component mount 12 may be configured to be operable without the inclusion of an adjustment member lock 32.

Referring again to FIGS. 1A-3, in one embodiment, the first mount body 14 includes at least one biasing member recess 66 formed thereon. In the illustrated embodiment, the first mount body 14 includes two biasing member recesses 66 formed on the first mount body 14, although those skilled in the art will appreciate that any number of biasing member recesses 66 may be formed thereon. The biasing member recesses 66 may be configured to receive various biasing devices therein, including, without limitations, kinematic biasing systems, springs, pins, thread members, and the like. As such, the biasing member recess 66 may be formed in any variety of shapes, sizes, and configurations.

FIGS. 1A, 1B, 2A, 2B and 4-8 show various views of the second mount body 16. As shown, the second mount body 16 may be separated from the first mount body 14 by at least one positioning relief 40. The positioning relief 40 may enable the second mount body 16 to be movably positioned proximate to the first mount body 14. Further, the second mount body 16 may include at least one positioning region formed thereon. In the illustrated embodiment, the second mount body 16 includes a first positioning region 50a, a second positioning region 50b, and a third positioning region 50c formed thereon. Each positioning region 50a, 50b, 50c, respectively, may include at least one positioning region surface. For example, the first positioning region 50a includes at least one first positioning region surface 60a. Similarly, the second positioning region 50b includes a second positioning region surface 60b, while the third positioning region 50c includes a third positioning region surface 60c.

Referring again to FIGS. 1A, 1B, 2A, 2B and 4-8, at least one positioning region may include at least one insert receiver or other passage formed therein. In the illustrated embodiment, the first positioning region 50a includes at least one first insert receiver 52a traversing there though or formed partially therein, the first insert receiver 52a configured to receive at least a first thermal compensating positioning insert 54a (hereinafter "positioning insert 54a") therein. In addition, the second positioning region 50b includes a second insert receiver 52b traversing there though or formed partially therein, the second insert receiver 52b configured to receive at least at least a second thermal compensating positioning insert 54b (hereinafter "positioning insert 54b") therein. Similarly, the third positioning region 50c includes a third insert receiver 52c traversing there though or formed partially therein, the third insert receiver 52c configured to receive at least a third thermal compensating positioning insert 54c (hereinafter "positioning insert 54c") therein. Those skilled in the art will appreciate that the insert receivers 52a, 52b, and 52c may be configured to receive any number of positioning inserts 54 therein. When inserted into an insert receiver, at least one engaging flange 58 formed on the positioning insert 54 is positioned proximate to and engaging the positioning region surface 60. For example, FIGS. 1B, 2B, 4, 5, 6A and 6B show the engaging flange 58b formed on the second positioning insert 54b positioned proximate to and engages the second positioning region surface 60b formed on the second insert receiver 52b. Similarly, the first engaging flange 58a formed on the first positioning insert 54a is positioned proximate to and engages the first positioning region surface 60a, while the third engaging flange 58c formed on the third positioning insert 54c is positioned proximate to and engages the third positioning region surface 60c. In the illustrated embodiments, the positioning inserts 54a, 54b, 54c are inserted into the second mount body 16. Those skilled in the art will appreciate that, optionally, at least one positioning insert may be inserted into at least one adjustment region of the first mount body 14.

As shown in FIGS. 1A, 1B, 2A, 2B and 4-6B, each positioning insert 54a, 54b, and 54c may be configured to receive one or more engaging bodies thereon. For example, in the illustrated embodiment, the first positioning insert 54a is configured to receive a first engaging body 56a therein, the second positioning insert 54b is configured to receive a second engaging body 56b therein, and the third positioning insert 54c is configured to receive a third engaging body 56c therein. In one embodiment, at least one engaging body 56a, 56b, and 56c is manufactured from carbide. In an alternate embodiment, at least one engaging body 56a, 56b, and 56c is manufactured from at least one material selected from the group consisting of aluminum, stainless steel, copper, brass, tungsten, tungsten, iron-based alloys, copper-based alloys, aluminum-base alloys, nickel-based alloys, other alloys, sapphire, engineered plastics, composite materials, polymers, elastomers, and the like. For example, in one embodiment, at least one adjustment member body 42 and at least one positioning insert 54 may be manufactured from a material having the same or similar coefficients of thermal expansion. In the alternative, at least one adjustment member body 42 and at least one positioning insert 54 may be manufactured from materials having the different or nonsimilar coefficients of thermal expansion. In an alternative embodiment, the positioning inserts 54a, 54b, 54c are configured without engaging bodies 56a, 56b and 56c.

Referring FIGS. 1A, 2B, 4 and 5, the second mount body 16 may include at least one biasing member recess 68 formed thereon. In one embodiment, the biasing member recess 68 formed on the second mount body 16 is co-aligned with at least a portion of the biasing member recess 66 formed on the first mount body 14 and configured to receive at least a portion of a biasing system or similar biasing device therein. For example, as shown in FIGS. 1A-5, a biasing system 70 comprising at least one biasing body 72 and at least one biasing pin 74 may be positioned within at least one of the biasing member recesses 66, 68, formed on the respective first and second mount bodies 14, 16. For example, in one embodiment the biasing body 72 comprises a spring device. During use, the biasing system 70 is configured to couple the second mount body 16 to the first mount body 14 in a movable relation. As such, at least a portion of the biasing system 70 is configured to traverse the positioning relief 40 formed between the first and second mount bodies 14, 16. Those skilled in the art will appreciate that any number of biasing systems of any variety may be used with the optical component mount 12.

Figure 6A:
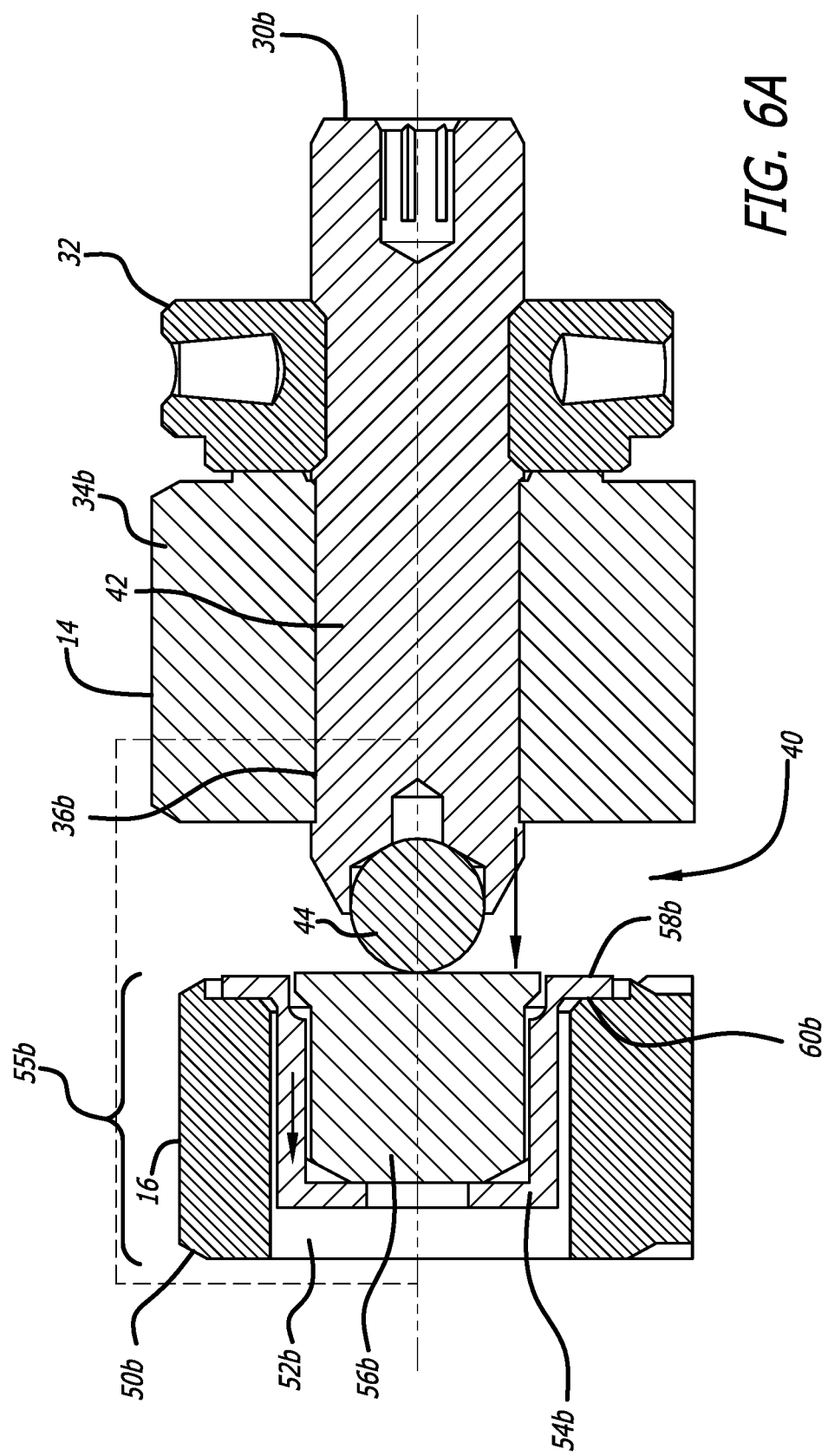
FIG. 6A shows a section view of an embodiment of a positioning region and an adjustment region of an embodiment of a thermal compensating optical component mount with a thermal compensating assembly.
Figure 6B:
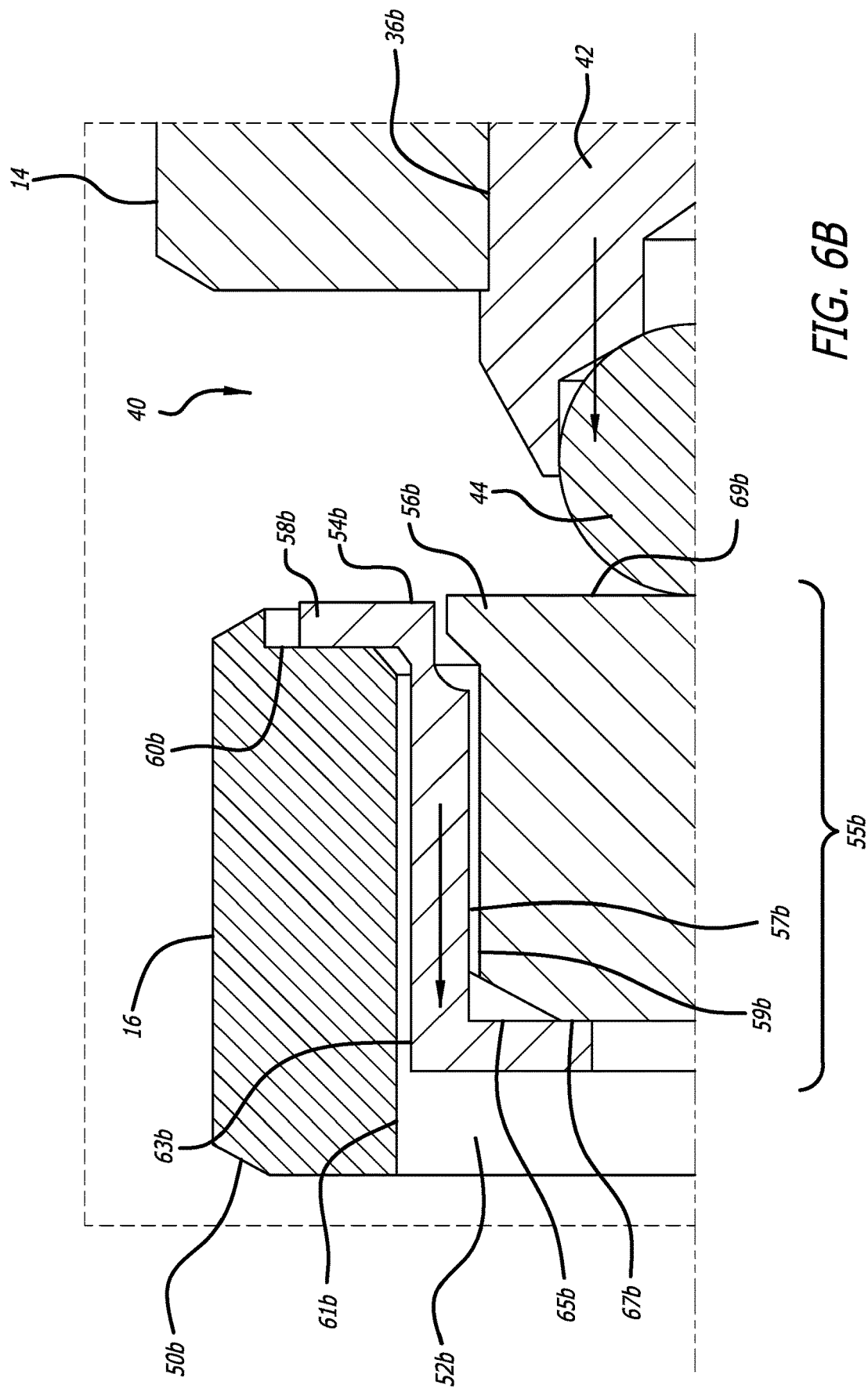
FIG. 6B shows a detailed view of the embodiment of the positioning region, the adjustment region and the thermal compensating assembly shown in FIG. 6A.

FIGS. 6A and 6B show cross-sectional views of an embodiment of the adjustment region 34b, the positioning region 50b of the optical component mount 12 shown in FIGS. 1A, 1B, 4 and 5 during use. As shown, the adjustment member 30 is inserted through the adjustment member lock 32 and the adjustment member passage 36b, and traverses the positioning relief 40 separating the first mount body 14 from the second mount body 16. As stated above, the adjustment member passage 36b may include threads and may be configured to engage the adjustment member body 42 in threaded relation. As such, the adjustment member body 42 may comprise a threaded body member. Alternatively, the adjustment member 30 may comprise other adjustment devices such as micrometers, thread-matched actuators, servo-motor driven linear actuators, stepper-motor driven linear actuators, piezoelectric-driven linear actuators, rotary actuators, and the like.

Referring again to FIGS. 6A and 6B, the engaging member 44 of the adjustment member 30 may be positioning on or coupled to the adjustment member body 42. As stated above, the second mount body 16 is coupled to the first mount body 14 by the forces applied by the biasing system 70 (See FIGS. 1A-5). The engaging member 44 may be configured to engage the second engaging body 56b inserted into the second positioning insert 54b located within the second insert receiver 52b formed in the second positioning region 50b of the second mount body 16. As such, actuation of the adjustment member 30 results in the adjustment member 30 traversing through the first mount body 14, across the positioning relief 40 and engaging the second mount body 16, thereby imparting a force onto the second mount body 16 sufficient to overcome the pre-load force applied by the biasing system 70, thereby permitting the second mount body 16 to be moved relative to the first mount body 14. As shown in FIGS. 6A and 6B, in one embodiment, only a portion of the second positioning insert 54b engages the second mount body 16. For example, as shown in FIGS. 6A and 6B, only the engaging flange 58b of the second positioning insert 54b engages with the second positioning region surface 60b. The second positioning insert 54b and the second engaging body 56b are configured such that the outside diameter 59b of the engaging body 56b is smaller than and not in contact with the inside diameter 57b of the second positioning insert 54b. Alternatively, the diameters 59b and 57b may be nearly equal and may contact each other, either as in a press-fit or other interference-fit configuration. The surface 67b of the engaging body 56b contacts the surface 65b of the second positioning insert 54b. As such, in the illustrated embodiment, when the ambient temperature increases, the portions of the adjustment member body 42 and the engaging member 44 that traverse the positioning relief 40 expand according to their respective coefficients of thermal expansion. Further, the positioning insert 54b expands according to its coefficient of thermal expansion such that the surface 67b of the engaging body 56b moves relative to the position of the second mount body 16. As a result of the increasing ambient temperature, the engaging body 56b also expands, such that the surface 69b of the engaging body 56b moves relative to surface 65b of the second positioning insert 54b. In this embodiment, the engaging body 56b may be manufactured from a material with a very low coefficient of thermal expansion. As a result of the configuration of this embodiment, variations in length along the axis of the adjustment member 30 due to temperature gradients or changes in ambient temperature may be compensated for by manufacturing the adjustment member body 42 and the engaging member 44 of the adjustment member 30 and the second positioning insert 54b and second engaging body 56b from the same materials or materials having similar coefficients of thermal expansion. As such, variations in the size of the positioning relief 40 between the first mount body 14 and the second mount body 16 are minimized during changes in ambient temperature, thus minimizing the movement of the optical component (not shown) positioned in the component aperture 18 of the optical component mount 12. In another embodiment, variations in the length along the axis of the adjustment member 30 due to temperature gradients or changes in ambient temperature may be compensated for by manufacturing the adjustment member body 42 and engaging member 44 of the adjustment member 30 and at least one of the second positioning insert 54b and second engaging body 56b from different materials or materials having dissimilar coefficients of thermal expansion. By choosing materials with different coefficients of thermal expansion, the performance of the thermal compensating optical component mount 12 can be customized. Those skilled in the art will appreciate that other configurations of the components described above may be employed to reduce or eliminate the effect of temperature gradients or changes in ambient temperature on the operation of the thermal compensating optical component mount 12.

Figure 1B:
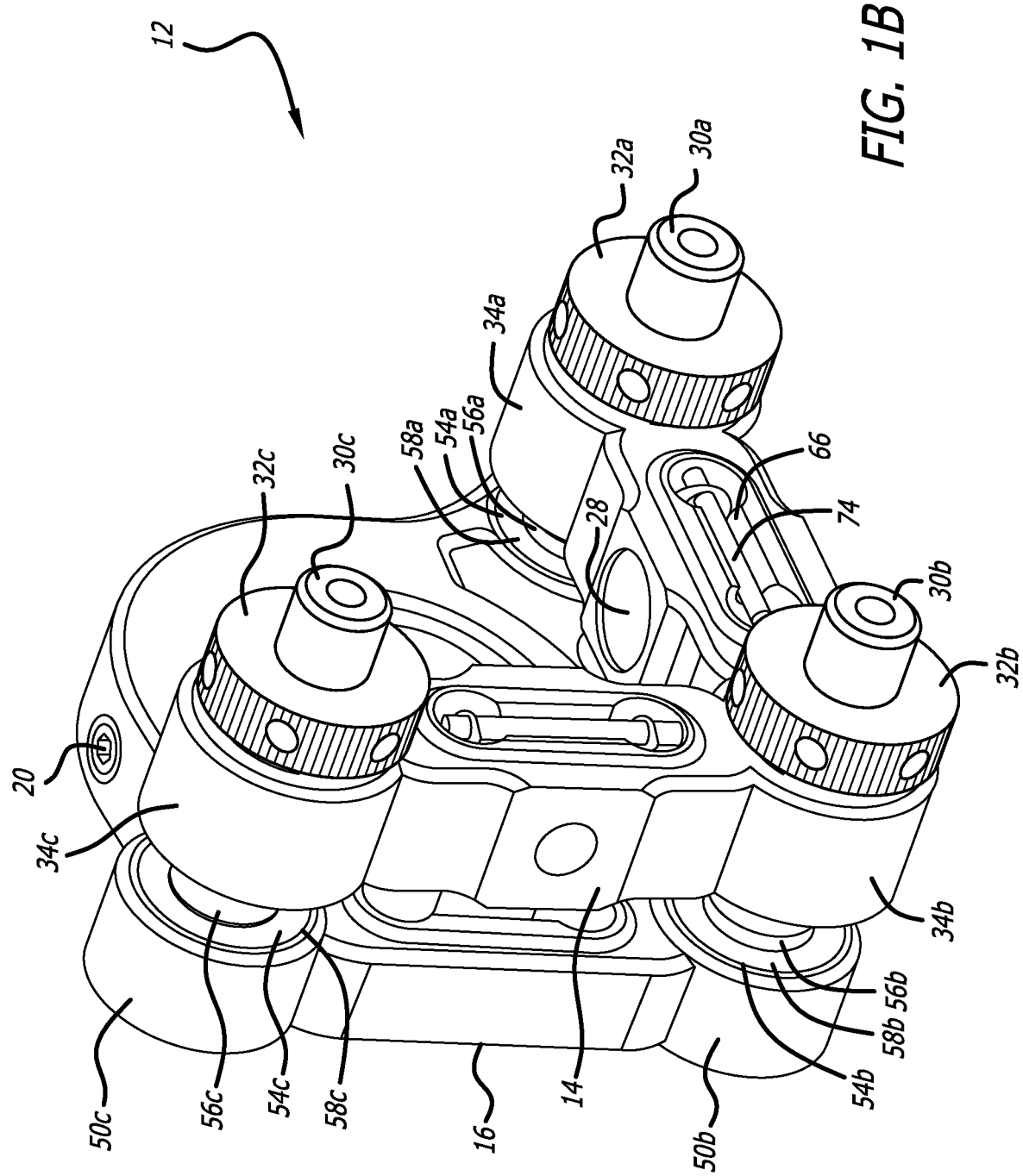
FIG. 1B shows a rear elevated perspective view of an embodiment of a thermal compensating optical component mount with three thermal compensating positioning inserts as shown in FIG. 1A.
Figure 2A:
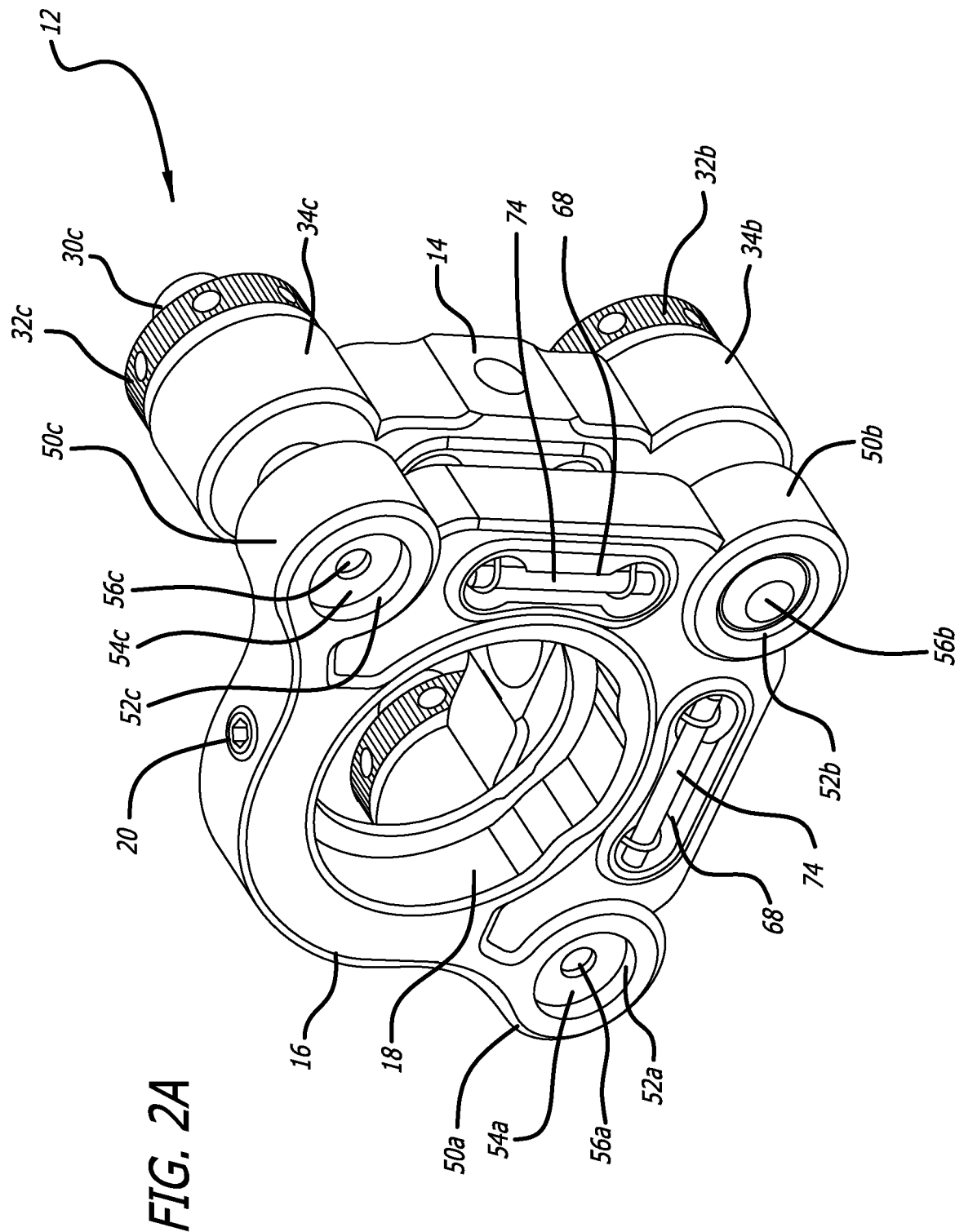
FIG. 2A shows a front elevated perspective view of an embodiment of a thermal compensating optical component mount with two thermal compensating positioning inserts.
Figure 2B:
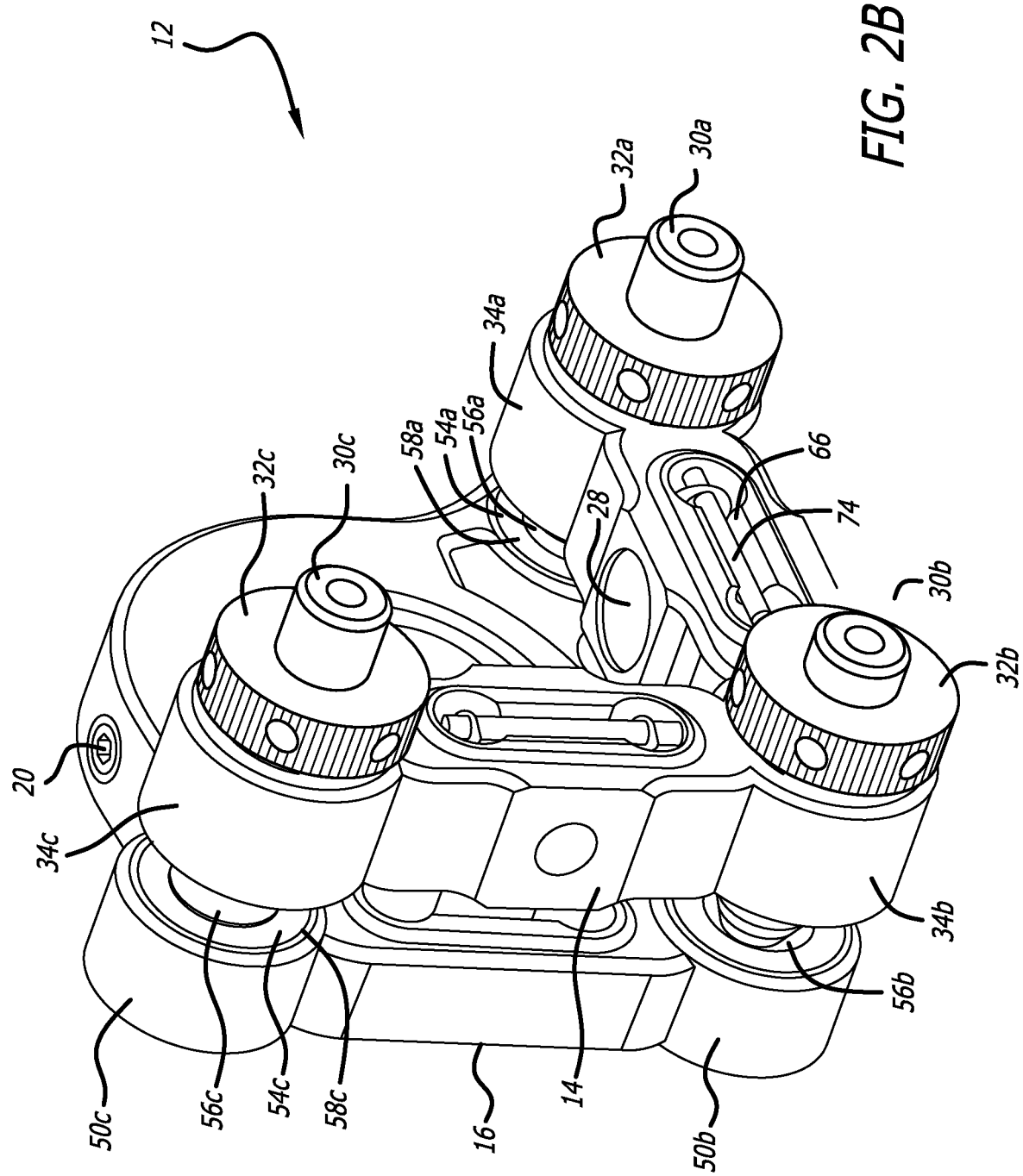
FIG. 2B shows a rear elevated perspective view of an embodiment of a thermal compensating optical component mount with two thermal compensating positioning inserts as shown in FIG. 2A.
Figure 4:
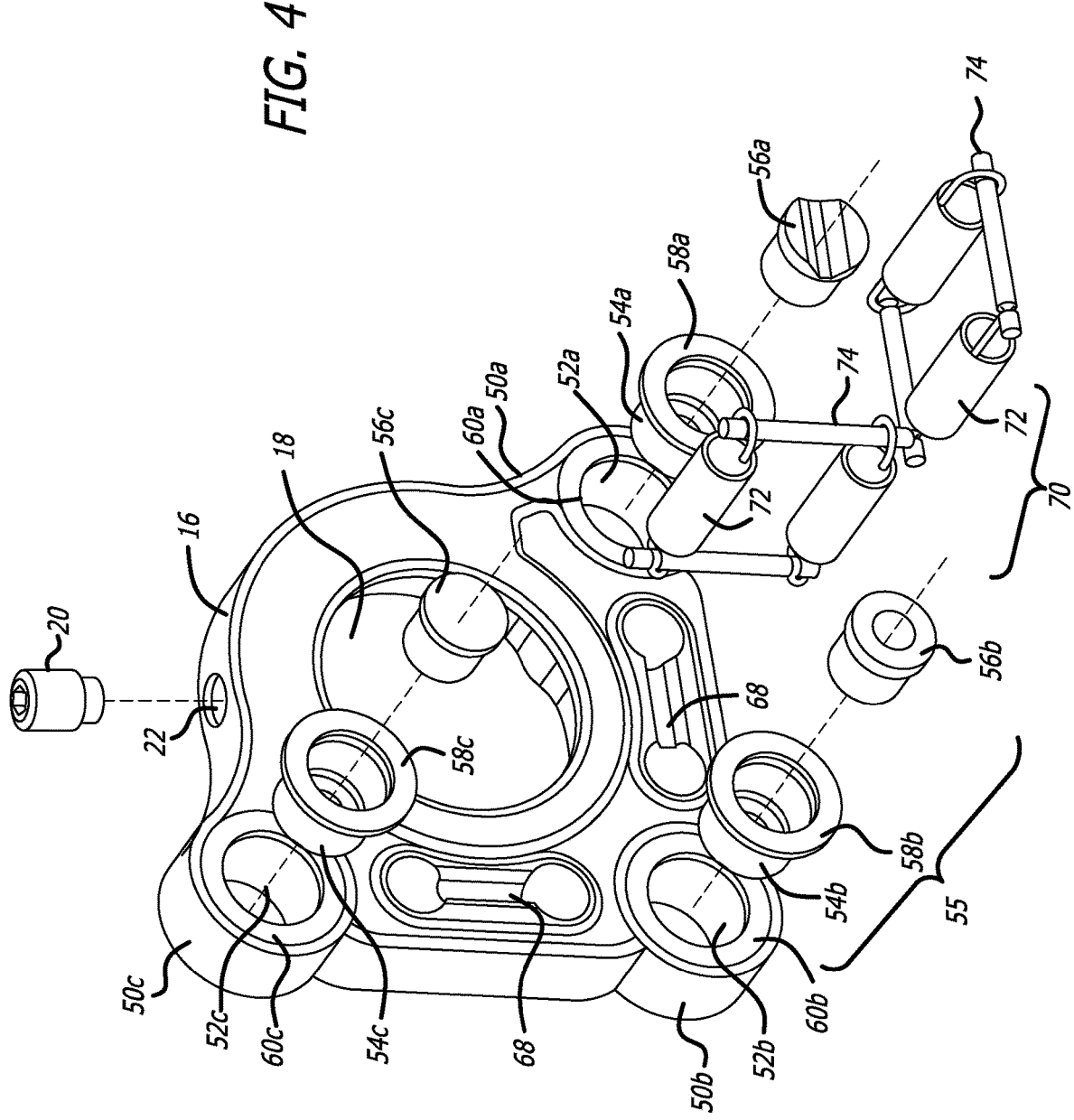
FIG. 4 shows an exploded perspective view of an embodiment of a second mount body with thermal compensating positioning inserts.

FIGS. 1A, 1B, and 4 show an embodiment of the thermal compensating optical component mount 12 where the positioning inserts 54a, 54b, 54c and engaging bodies 56a, 56b, 56c are positioned within insert receivers 52a, 52b and 52c, respectively. FIGS. 2A and 2B show an alternative embodiment wherein there is no positioning insert 54b inserted into the insert receiver 52b of the positioning region 50b. Instead, an engaging body 56b is placed in the insert receiver 52b without a positioning insert 54b. As such, in this embodiment, there is no thermal compensating capability at that position of the optical component mount 12. Alternatively, there may be no positioning inserts 54a or 54c inserted into insert receivers 52a or 52c, respectively, of the second mount body 16. Those skilled in the art will appreciate that there can be multiple configurations of positioning regions 50 that have or do not have positioning inserts 54 positioned within the respective insert receivers 52.

FIGS. 4, 5, 6A and 6B show various views of an embodiment of a thermal compensating assembly 55 comprising at least one positioning insert 54c and at least one engaging body 56b. Those skilled in the art will appreciate that the thermal compensating assembly 55 can be used in a wide variety of applications. In one embodiment, a conventional optical component mount may be converted to a thermal compensating optical component mount by the installation of a positioning insert 54b and an engaging body 56b into an insert receiver 52b formed in a positioning region 50b of the conventional optical component mount.

Figure 7A:
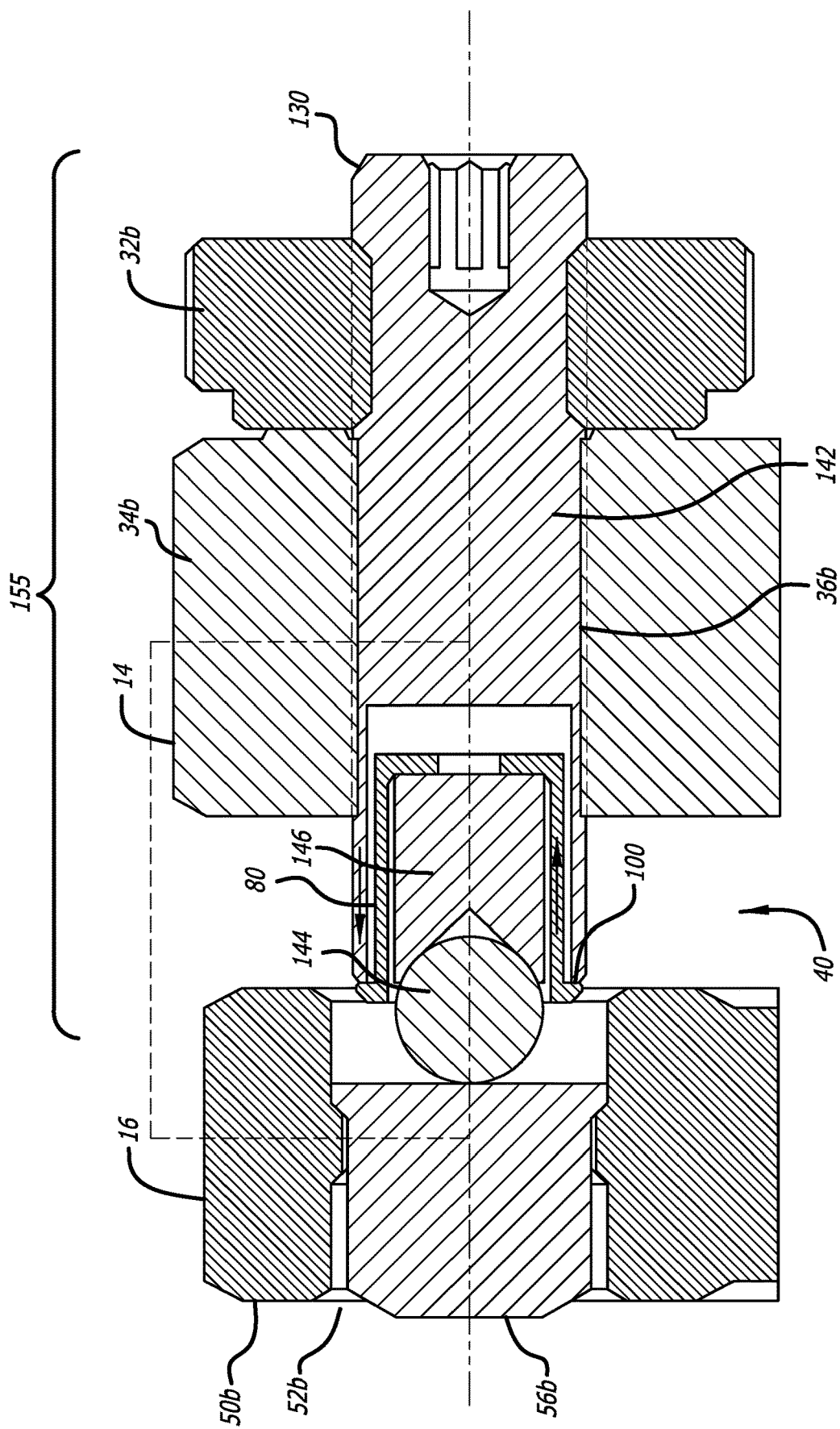
FIG. 7A shows a section view of an alternate embodiment of a positioning region and an adjustment region of a thermal compensating optical component mount.
Figure 7B:
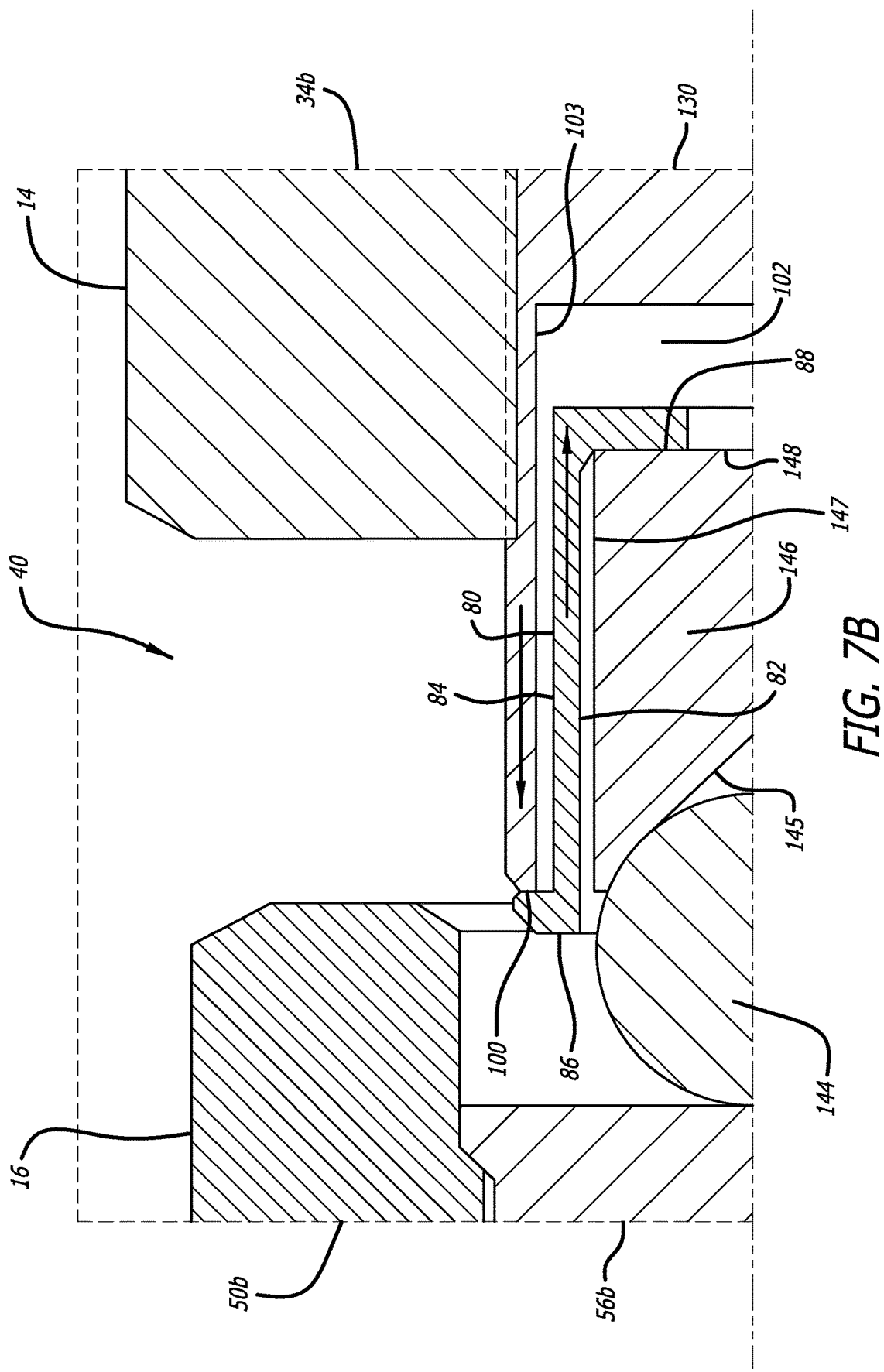
FIG. 7B shows a detailed view of the alternate embodiment of a positioning region, an adjustment region, and a thermal compensating assembly of a thermal compensating optical component mount as shown in FIG. 7A.

FIGS. 7A and 7B show various views of an embodiment of a thermal compensating adjusting assembly for use with the optical component mount 12. In the illustrated embodiment, the thermal compensating adjusting assembly 155 comprises at least one adjustment member 130, at least one thermal compensating positioning insert 80 (hereinafter "positioning insert 80"), at least one engaging member 144 and at least one engaging body 146. In the illustrated embodiment, the positioning insert 80 is formed from bronze. Optionally, the positioning insert 80 may be formed from any variety of materials, including, without limitations, aluminum, steel, stainless steel, Kovar, Invar, copper, carbide, tungsten, iron-based alloys, copper-based alloys, aluminum-based alloys, nickel-based alloys, other alloys, engineered plastics, composite materials, and the like. The engaging member 144 is positioned within at least one engaging body receiver 145 formed in the engaging body 146. Alternatively, the engaging member 144 and the engaging body 146 may comprise a monolithic structure. In the illustrated embodiment, the engaging member 144 and the engaging body 146 are formed from carbide. Optionally, the engaging member 144 and the engaging body 146 may be formed from any variety of materials, including, without limitations, aluminum, stainless steel, Kovar, Invar, copper, bronze, carbide, tungsten, iron-based alloys, copper-based alloys, aluminum-based alloys, nickel-based alloys, other alloys, engineered plastics, composite materials, and the like.

As shown, the adjustment member 130 includes at least one adjustment member body 142 with at least one end surface 100 and at least one insert receiver 102 with a diameter 103 formed in the adjustment member body 142. In the illustrated embodiment, the adjustment member body is formed from bronze. Those skilled in the art will appreciate that the adjustment member body may be formed from a variety of other materials. The positioning insert 80 may be positioned within the insert receiver 102. The positioning insert 80 may be configured with at least one flange 86, at least one outside diameter 84, at least one inside diameter 82 and at least one surface 88. The outside diameter 84 of the insert 80 may be configured to be less than the inside diameter 103 of the insert receiver 102. As such, changes in the dimensions of the positioning insert 80 depending on changes in temperature are not constrained by the insert receiver 102. The engaging body 146 may be configured with at least one diameter 147 and at least one surface 148 and is positioned within the diameter 82 of the positioning insert 80. In the illustrated embodiment, the surface 148 of the engaging body 146 is in contact with the surface 88 of the positioning insert 80. Additionally, in one embodiment, the diameter 147 of the engaging body 146 may be smaller than the diameter 82 of the positioning insert 80. As such, changes in the dimensions of the engaging body 146 depending on changes in temperature are not constrained by the diameter 82 of the positioning insert 80.

Further, referring to FIGS. 7A and 7B, in the illustrated embodiment, during use, when the ambient temperature surrounding the optical component mount 12 increases, the portion of the adjustment member body 142 that traverses the positioning relief 40 expands, moving the surface 100 of the adjustment member body 142 to the left as indicated by the arrow on the adjustment member body 142. Simultaneously, the positioning insert 80 expands, moving the surface 88 to the right as indicated by the arrow located on the positioning insert 80. Simultaneously, the engaging body 146 expands, moving the engaging member 144 to the left and shown by the arrow located on the engaging member 146. In the illustrated embodiment, the coefficient of thermal expansion of the adjustment member body 142 is equal to the coefficient of thermal expansion of the positioning insert 80, and the coefficient of thermal expansion of the engaging member 146 is lower than that of either the positioning insert 80 or the adjustment member body 142. As such, depending on the relative lengths of the positioning insert 80 and the engaging body 146, changes in ambient temperature surrounding the optical component mount 12 may have a minimal effect on the size of the positioning relief 40, thereby minimizing the effect of changes in ambient temperature on the position of any optic (not shown) that is retained within the component aperture 18.

As shown in FIGS. 7A and 7B, during use, the adjustment member 130 is inserted through the adjustment member lock 32 and the adjustment member passage 36b and traverses the positioning relief 40 separating the first mount body 14 from the second mount body 16. The adjustment member passage 36b may include threads and be configured to engage the adjustment member body 142 in threaded relation. As such, the adjustment member body 142 may comprise a threaded body member. Alternatively, the adjustment member 130 may comprise a micrometer, thread-matched actuator, servo-motor driven linear actuator, stepper-motor driven linear actuator, piezoelectric-driven linear actuator, magnetostrictive linear actuator, rotary actuators, and the like.

Referring again to FIGS. 7A and 7B, in the illustrated embodiment, the engaging member 144 may be configured to contact the second engaging body 56b located within the second insert receiver 52b formed in the second positioning region 50b of the second mount body 16. The second mount body 16 is coupled to the first mount body 14 by the forces applied by the biasing system 70 (See FIGS. 1A-5). As such, actuation of the adjustment member 130 results in the adjustment member 130 traversing the positioning relief 40 and engaging the second mount body 16, thereby imparting a force onto the second mount body 16 sufficient to overcome the pre-load force applied by the biasing system 70. As described above, variations in the length along the axis of the adjustment member 130 due to temperature gradients may be compensated for by manufacturing the adjustment member body 142 and the positioning insert 80 from the same material or from materials having similar coefficients of thermal expansion. In another embodiment, variations in the length along the axis of the adjustment member 130 due to temperature gradients or changes in ambient temperature may be compensated for by manufacturing the adjustment member body 142 and the positioning insert 80 from different materials or materials having dissimilar coefficients of thermal expansion. Those skilled in the art will appreciate that any number of combinations of materials may be used in order to achieve the results described above.

Figure 8:
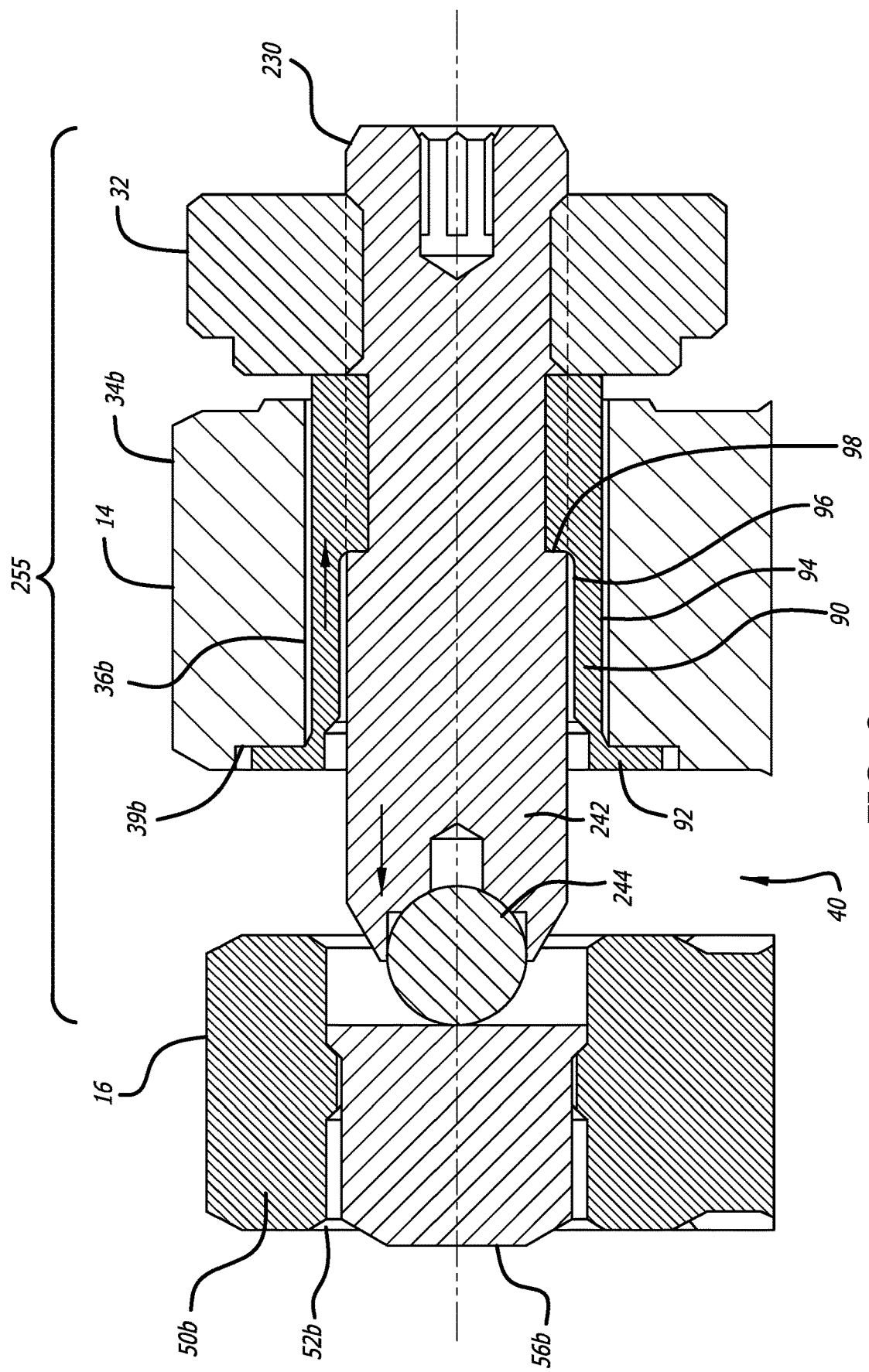
FIG. 8 shows a section view of an alternate embodiment of an adjustment region, an adjustment region and a thermal compensating assembly of a thermal compensating optical component mount.

FIG. 8 shows a view of an embodiment of a thermal compensating adjustment assembly for use with the optical component mount 12. In the illustrated embodiment, the thermal compensating adjusting assembly 255 comprises at least one adjustment member 230, at least one adjustment member lock 32 and at least one thermal compensating positioning insert 90 (hereinafter "positioning insert 90"). As shown, the first mount body 14 includes an adjustment region 34b having a second adjustment member receiver 36b formed therein. At least one surface 39b is formed on the second adjustment region 34b. At least one flange member 92 may be formed on the positioning insert 90. In the illustrated embodiment, the flange member 92 engages the engaging face 39b and the thermal compensating positioning insert 90 is configured with a diameter 94 that is smaller than the second adjustment member receiver 36b. As such, the positioning insert 90 may be inserted into the second adjustment member receiver 36b in a slip-fit configuration. Alternatively, the positioning insert 90 may engage the second adjustment member receiver 36b in a press-fit configuration. Those skilled in the art will appreciate that the positioning insert 90 may engage the second adjustment member receiver 36b in a variety of ways.

As shown in FIG. 8, the positioning insert 90 may include threads and be configured to engage the adjustment member body 242 in threaded relation. The engaging member 244 may be positioned on or coupled to the adjustment member body 242 of the adjustment member 230. Alternatively, the engaging member 244 and the adjustment member body 242 may comprise a monolithic structure. The second mount body 16 may be coupled to the first mount body 14 by the forces applied by the biasing system 70 (See FIGS. 1A-5). The engaging member 244 may be configured to engage the second engaging body 56b located within the second insert receiver 52b formed in the second positioning region 50b of the second mount body 16. As such, actuation of the adjustment member 230 results in the adjustment member 230 traversing the positioning relief 40 and engaging the second mount body 16, thereby imparting a force onto the second mount body 16 sufficient to overcome the pre-load force applied by the biasing system 70. Those skilled in the art will appreciation that the adjustment member 230 may comprise a micrometer, thread-matched actuator, servo-motor driven linear actuator, stepper-motor driven linear actuator, piezoelectric-driven linear actuator, magnetostrictive linear actuator, rotary actuators and the like.

Referring again to FIG. 8, in the illustrated embodiment, during use, when the ambient temperature surrounding the optical component mount 12 increases, the adjustment member body 242 and the engaging member expand to the left as indicated by the arrow on the adjustment member body 242, imparting a force on the engaging body 56b. Simultaneously, the positioning insert 90 expands, moving the surface 98 to the right as indicated by the arrow located on the positioning insert 90. In the illustrated embodiment, the coefficient of thermal expansion of the adjustment member body 242 and the engaging member 244 are equal to the coefficient of thermal expansion of the positioning insert 90. As such, depending on the relative lengths of the positioning insert 90, the adjustment member body 242 and the engaging member 244, changes in ambient temperature surrounding the optical component mount 12 may have a minimal effect on the size of the positioning relief 40, thereby minimizing the effect of changes in ambient temperature on the position of any optic (not shown) that is retained within the component aperture 18.

As described above, in the illustrated embodiment, variations in length along the axis of the adjustment member 230 due to temperature gradients or variations in ambient temperature may be compensated for by manufacturing the positioning insert 90 from materials having similar coefficients of thermal expansion. In another embodiment, variations in the length along the axis of the adjustment member 230 due to temperature gradients or variations in ambient temperature may be compensated for by manufacturing the positioning insert 90 from materials having different coefficients of thermal expansion. Those skilled in the art will appreciate that the adjustment member 230 and the positioning insert 90 may be manufactured from any number of materials with the same or different coefficients of thermal expansion.

The embodiments disclosed herein are illustrative of the principles of the invention. Other modifications may be employed which are within the scope of the invention. Accordingly, the devices disclosed in the present application are not limited to that precisely as shown and described herein.

What is claimed is:

1. An optical component mount, comprising
   at least one first mount body;
   at least one adjustment member traversing through at least one adjustment member passage formed in the at least one first mount body, the at least one adjustment member comprising at least one adjustment member body and at least one engaging member;
   at least one second mount body having at least one component aperture and at least one insert receiver formed therein;
   at least one thermal compensating positioning insert positioned within the at least one insert receiver, the at least one thermal compensating positioning insert configured to have a coefficient of thermal expansion equal to the coefficient of thermal expansion of the at least one adjustment member body;
   at least one engaging body positioned within the at least one thermal compensating positioning insert and configured to contact the at least one engaging member, the at least one engaging body further configured to have a coefficient of thermal expansion not equal to the coefficient of thermal expansion of the at least one adjustment member body or the coefficient of thermal expansion of the at least one thermal compensating positioning insert; and
   at least one biasing system to movably couple the at least one second mount body to the at least one first mount body.

2. The optical component mount of claim 1, further comprising at least one adjustment member lock configured to restrict movement of at least one of the at least one adjustment members.

3. The optical component mount of claim 1, configured with three thermal compensating positioning inserts.

4. The optical component mount of claim 1, configured with two thermal compensating positioning inserts.

5. The optical component mount of claim 1, configured with one thermal compensating positioning insert.

6. The optical component mount of claim 1, wherein the at least one adjustment member comprises at least one threaded adjustment member body.

7. The optical component mount of claim 1, wherein the at least one adjustment member further comprises at least one engaging member.

8. The optical component mount of claim 1, wherein the at least one adjustment member comprises at least one linear actuator.

9. The optical component mount of claim 8, wherein the at least one linear actuator is chosen from a group consisting of: micrometers, servo-motor driven linear actuators, stepper-motor driven linear actuators, piezoelectric-driven linear actuators and magnetostrictive linear actuators.

10. The optical component mount of claim 1, wherein the at least one adjustment member comprises at least one rotary actuator.

11. The optical component mount of claim 1, wherein the at least one adjustment member comprises at least one thread-matched rotary actuator.

12. An optical component mount, comprising:
   at least one first mount body;
   at least one adjustment member traversing through at least one adjustment member passage formed in the at least one first mount body;
   at least one second mount body having at least one component aperture and at least one insert receiver formed therein;
   at least one thermal compensating positioning insert positioned within the at least one insert receiver, the at least one thermal compensating positioning insert configured having a coefficient of thermal expansion equal to the coefficient of thermal expansion of the at least one adjustment member; and
   at least one biasing system to movably couple the at least one second mount body to the first mount body.

* * * * *